(12) United States Patent
Espejo

(10) Patent No.: US 7,080,844 B2
(45) Date of Patent: Jul. 25, 2006

(54) TRANSPORTABLE SHOPPING CART

(76) Inventor: Gilbert Bobby Espejo, 51 Cypress Rd., Dumont, NJ (US) 07628

( * ) Notice: Subject to any disclaimer, the term of this patent is extended or adjusted under 35 U.S.C. 154(b) by 0 days.

(21) Appl. No.: 11/051,731

(22) Filed: Feb. 4, 2005

(65) Prior Publication Data

US 2005/0173878 A1 Aug. 11, 2005

Related U.S. Application Data

(60) Provisional application No. 60/541,653, filed on Feb. 5, 2004.

(51) Int. Cl.
*B62B 3/02* (2006.01)

(52) U.S. Cl. ............... 280/33.995; 280/33.996; 280/33.997; 280/639

(58) Field of Classification Search ......... 280/33.995, 280/33.991, 33.992, 33.993, 33.996, 33.997, 280/47.35, 638, 639, 640, 33.994; 297/16.2; 414/467, 347, 399, 458, 498, 345, 340; 187/243, 187/244, 269

See application file for complete search history.

(56) References Cited

U.S. PATENT DOCUMENTS

| | | | | |
|---|---|---|---|---|
| 2,901,262 A | * | 8/1959 | Berlin | 280/641 |
| 3,118,553 A | * | 1/1964 | Rosenzweig | 414/469 |
| 3,774,929 A | * | 11/1973 | Stanley | 280/641 |
| 4,492,388 A | * | 1/1985 | de Wit | 280/651 |
| 4,813,701 A | * | 3/1989 | Balland | 280/641 |
| 5,538,386 A | * | 7/1996 | Scheibel | 414/467 |
| 5,649,718 A | * | 7/1997 | Groglio | 280/641 |
| 6,024,527 A | * | 2/2000 | Soriano | 414/345 |
| 6,070,899 A | * | 6/2000 | Gines | 280/651 |
| 6,431,319 B1 | * | 8/2002 | Myers et al. | 187/243 |
| 6,889,998 B1 | * | 5/2005 | Sterns et al. | 280/651 |
| 6,932,363 B1 | * | 8/2005 | D'Angelo | 280/33.991 |

FOREIGN PATENT DOCUMENTS

GB    2234472 A    * 2/1991

* cited by examiner

*Primary Examiner*—J. Allen Shriver
(74) *Attorney, Agent, or Firm*—Clifford G. Frayne

(57) ABSTRACT

A transportable cart having a basket with a lift mechanism that raises the unit to the cargo floor height of the vehicle, and also used to lower the basket to a comfortable working height for the user while shopping. A slide mechanism includes a frame member, a set of guide rails, a plurality of wheels and rollers to guide the basket and frame assemblies into and out of the vehicle. A plurality of legs and base frame members connected by a plurality of cross members and hinges that are foldable to a compact arrangement and fits in place alongside the basket inside the vehicle. Wheels or casters attached to the base frame that contacts the ground when the cart is unloaded from the vehicle.

5 Claims, 8 Drawing Sheets

TRANSPORTABLE SHOPPING CART

RELATED APPLICATIONS

Applicant claims the benefit of provisional application Ser. No. 60/541,653, filed Feb. 5, 2004.

BACKGROUND OF THE INVENTION

1. Field of the Invention

This invention relates generally to a shopping cart, and more particularly, to a transportable shopping cart that allows the user to load and unload the entire cart with its contents in and out of a vehicle.

2. Description of the Prior Art

Conventional shopping carts are limited for use within the compounds of a shopping establishment. Shoppers have to manually transfer their goods from the cart into their vehicles. Then they have to manually carry the goods, usually in several trips, from the vehicle to their homes. This is difficult for people with infants or small children, especially for those who dwell in tall buildings. These people at times have to park their vehicles from a distance to their building entrances. They have to carry their goods into the building, into the elevator, through the hallways, then finally into their dwelling units. These difficulties are further enhanced in inclement weather conditions.

There are inventions of folding or collapsing carts, such as U.S. Pat. No. 4,765,644, Aug. 23, 1988 and U.S. Pat. No. 5,700,021, Dec. 23, 1997, where the user has to empty and transfer the cart's contents into the vehicle, then it is folded, picked up and loaded into the vehicle. These current inventions do not allow the users to effortlessly load the cart without taking out its contents directly into the vehicle.

An invention by Cortes Patent No. 5,906,383, May 25, 1999, for a "Home Shopping Cart" consists of a low profile cart with handles attached to the top edge of the basket. The user has to manually lift the entire cart from the ground and load it into a vehicle's trunk.

This invention addresses those problems and differs from prior art since it allows the user to conveniently load and unload the transportable shopping cart with its contents in and out of their vehicles without manually transferring their goods nor lifting the entire cart.

The cart can be used for a variety of applications not limited to shopping. It can also be designed for use in commercial applications where the basket is replaced with shelves or any types of load carrying devices, and the frames are modified to be suitable for use in cargo vans or trucks. Such commercial applications include, but are not limited to, food catering, delivery service, transport or construction materials, tools or equipment, portable display cart, temporary tables for a variety of applications, and others.

OBJECTS OF THE INVENTION

An object of the invention is to provide for a novel transportable shopping cart that directly loads and unloads in and out of a vehicle without taking out its contents.

A further object of the present invention is to provide a design for mechanizing the transportable shopping cart's basket, legs and frames to fold and enter into a vehicle's cargo room.

A still further object of the present invention is the design of a transportable shopping cart that is suitable for use with the diverse cargo load heights and internal dimensions of various vehicle makes and models.

SUMMARY OF THE INVENTION

These and other objects of the present invention are achieved by a transportable cart having the following:

A basket with a lift mechanism that raises the unit to the cargo floor height of the vehicle, and also used to lower the basket to a comfortable working height for the user while shopping. The basket dimensions take into account the space limitations inside the vehicle's cargo area while providing the optimum basket capacity.

A slide mechanism includes a frame member, a set of guide rails, a plurality of wheels and rollers to guide the basket and frame assemblies into and out of the vehicle.

A plurality of legs and base frame members connected by a plurality of cross members and hinges that are foldable to a compact arrangement and fits in place alongside the basket inside the vehicle. The length of the legs when unfolded should conform to the cargo load height of the vehicle. The legs can be made adjustable in length to compensate for varying cargo load heights of various vehicle makes and models.

A latch mechanism to lock the basket to the frame and lock mechanisms for the basket's rear rollers to prevent the cart from shifting inside the vehicle.

Wheels or casters attached to the base frame that contacts the ground when the cart is unloaded from the vehicle.

BRIEF DESCRIPTION OF THE DRAWINGS

These and other objects of the present invention will become apparent, particularly when taken in light of the following illustrations wherein:

FIG. 1A is an enlarged view of section A in FIG. 1;

DETAILED DESCRIPTION OF THE INVENTION

Figure 1:
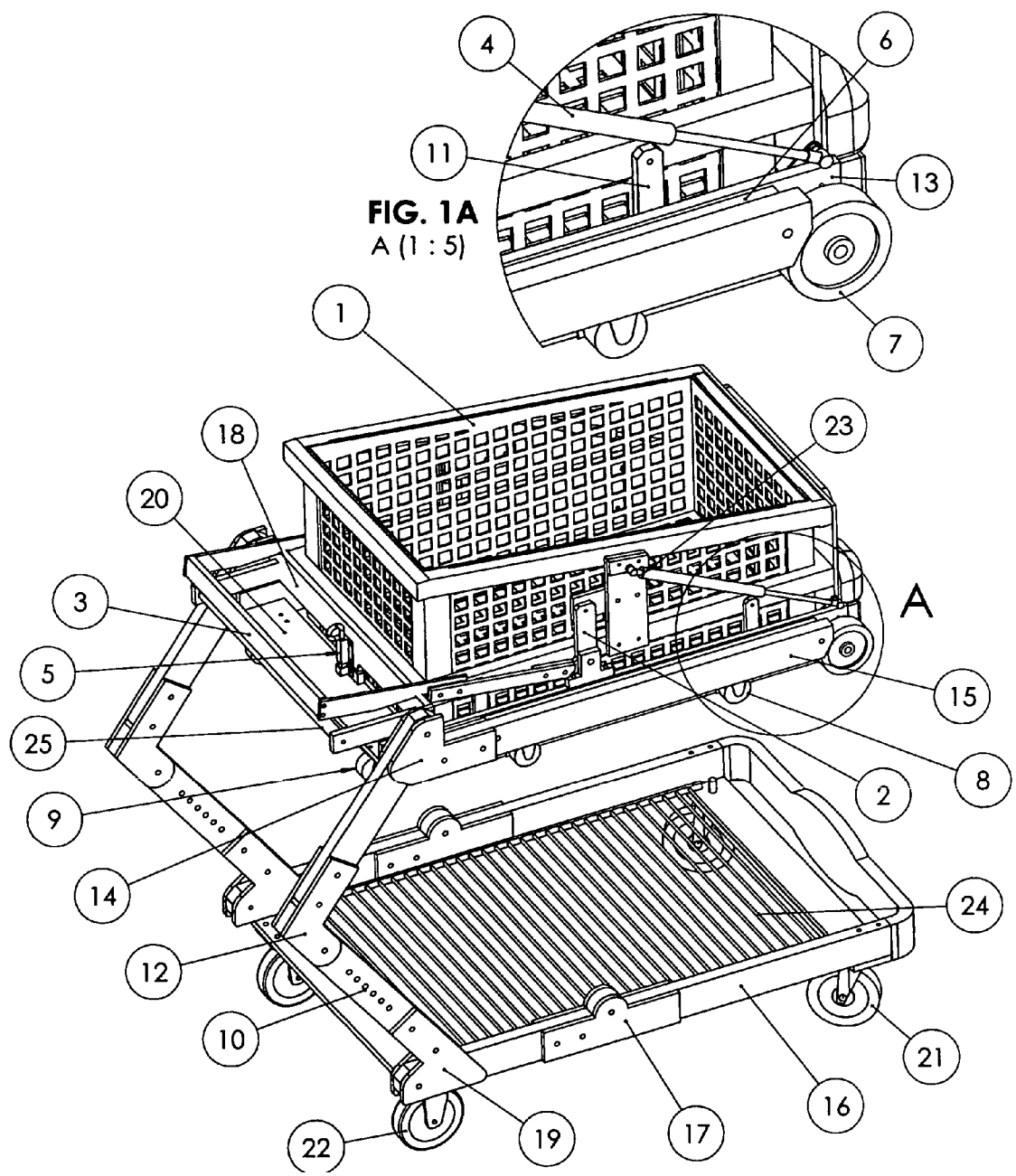
FIG. 1 is an isometric view of the transportable shopping cart according to the present invention.
Figure 2:
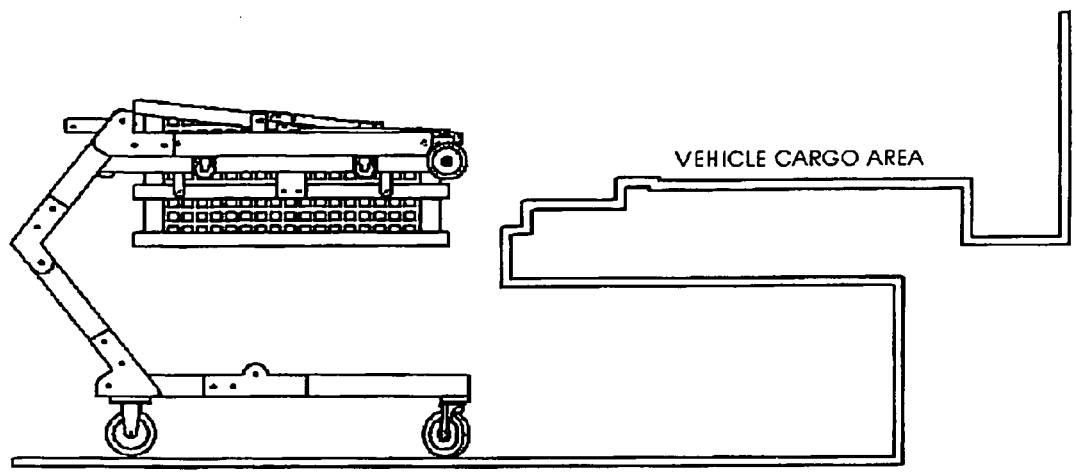
FIG. 2 is a side view of the transportable shopping cart and a cross sectional representation of a vehicle's cargo area. The basket is in the "down" position.
Figure 4:
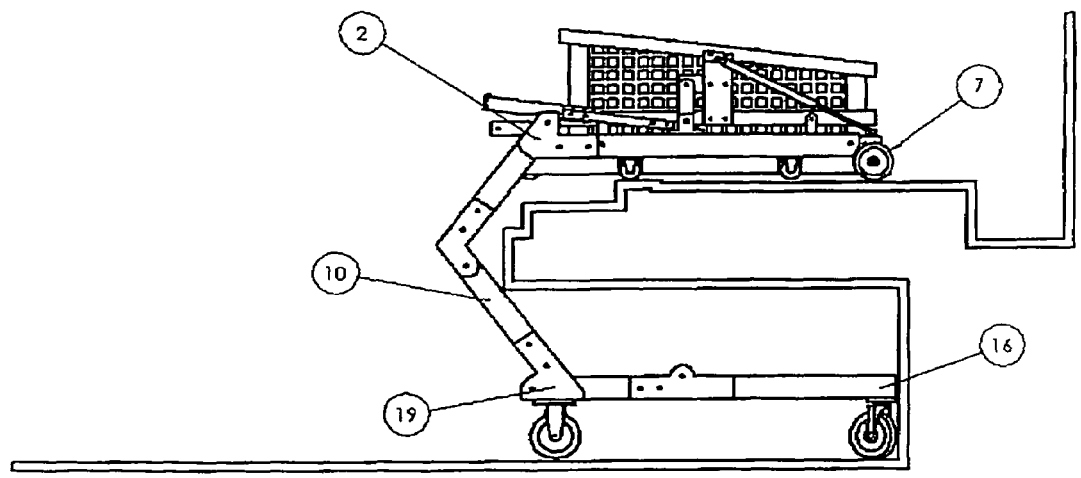
FIG. 4 is a side view of the transportable shopping cart as it enters the vehicle.
Figure 5:
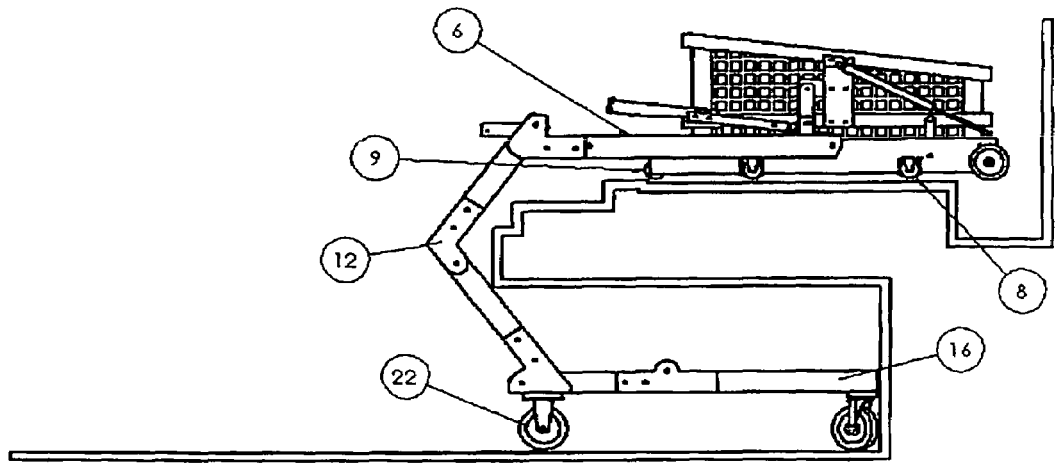
FIG. 5 is a side view of the transportable shopping cart with the basket assembly extended inside the vehicle.
Figure 6:
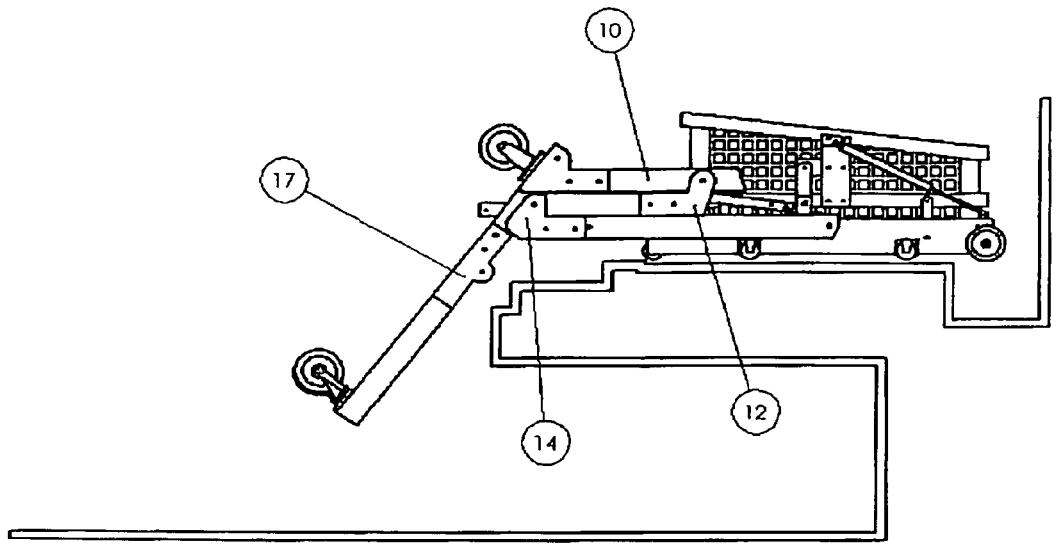
FIG. 6 is a side view of the transportable shopping cart with the upright leg assembly folded up.
Figure 7:
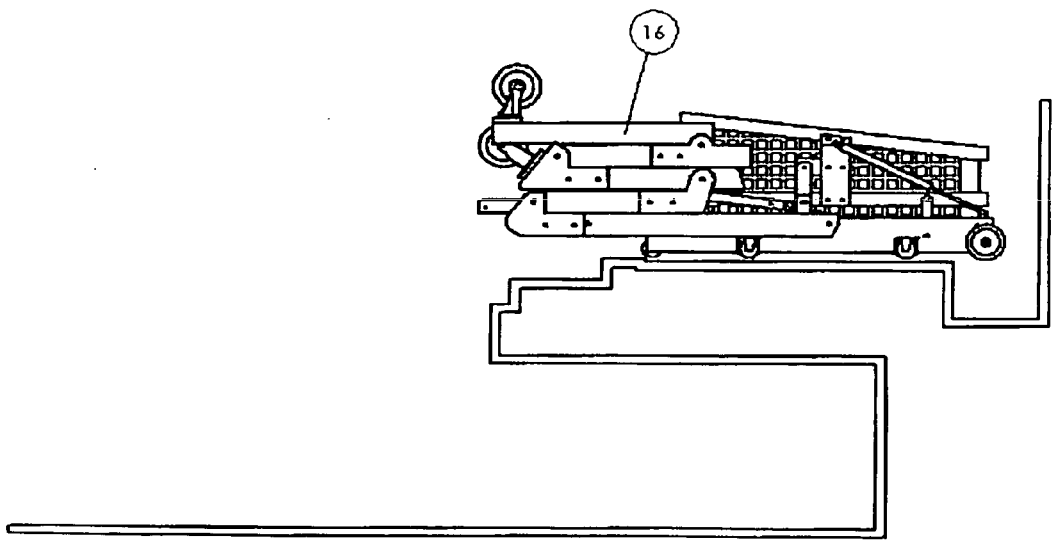
FIG. 7 is a side view of the transportable shopping cart with the base leg assembly folded up.
Figure 8:
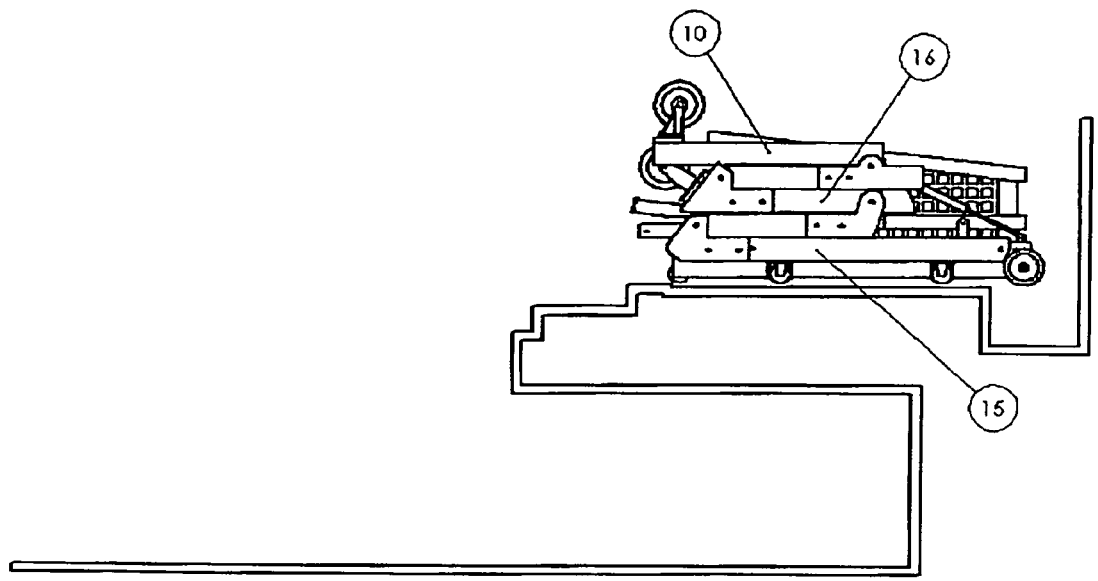
FIG. 8 is a side view of the transportable cart fully loaded inside the cargo area of a vehicle.

Referring now to the drawings, wherein like reference numerals are used for similar elements throughout, FIGS. 1 and 1A illustrate a cart particularly suited for use as shopping cart that can be loaded into a vehicle with flat cargo space and has a relatively high load height. The basket can be designed in a variety of different shapes and sizes that can fit into a cargo space of a specific vehicle make or model. The basket 1 is shown in its "up" position and can be lowered to the "down" position as shown in FIG. 2 by shifting the basket lift arm 2. This feature is explained further in Step 2 as described in sequence of operation below. The basket 1 is held in the "up" or "down" positions by a plurality of gas springs 4 that are connected by swivel mounts 23 at one end to the basket 1 and the other end to the basket glide members 13. Furthermore, the gas springs 4 assists the user to lift the basket to its "up" position especially when the cart is filled with a heavy load. The basket 1 is connected and pivots "up" or "down" along the basket slide mechanism's horizontal member 13 with the use of a plurality of pivot connecting arms 11. The basket slide mechanism's horizontal members 13 are connected to the upper frame horizontal members 15 by slide rails 6. The slide rails 6 are used to move the basket 1 to an extended position inside the vehicle as shown in FIGS. 5, 6 and 7 and back to a retracted position as shown in FIGS. 4 and 8. The latch mechanism 5 locks the basket slide mechanism's cross member 20 to the upper frame cross member 18 thereby preventing the basket from extending unintentionally. The user has to unlatch the mechanism 5 before the basket can be extended. The latch mechanism engages when the basket is retracted. A plurality of lead-in basket wheels 7, rollers 8 and rear baset wheels 9 are mounted to the basket slide mechanism's horizontal member 13 to allow the basket to easily traverse on the surface of the vehicles cargo floor as shown in FIGS. 4 and 5.

Figure 3:
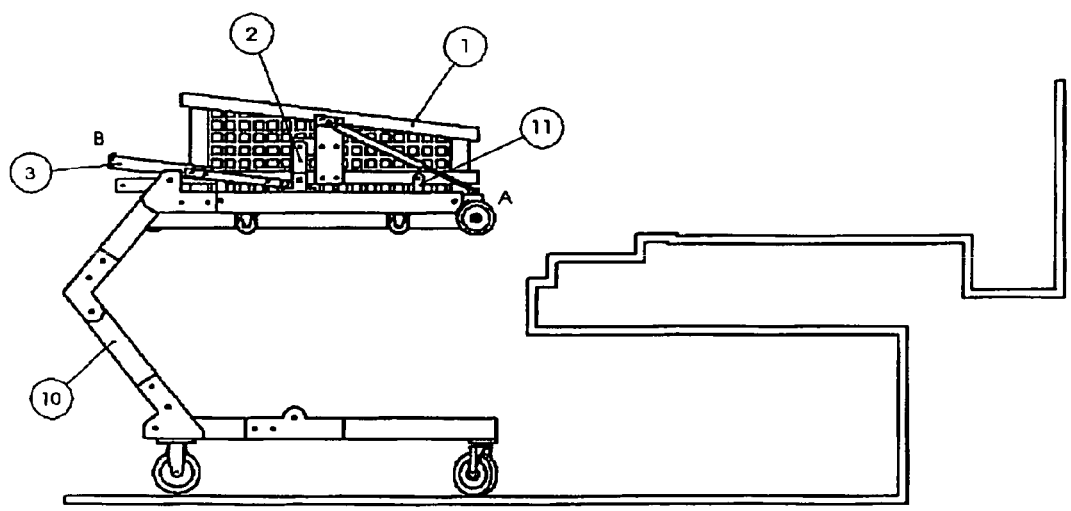
FIG. 3 is a side view of the transportable shopping cart with the basket in the "up" position.

The upper frame horizontal members 15 are connected to a plurality of unright legs 10 by an individual upper hinges 14. The lengths of the upright legs are designed to properly align the lead in basket wheels 7 to the cargo floor height of the vehicle as shown in FIG. 3. The upright legs 10 can be designed to have an adjustable length in order for the cart to compensate for the various cargo floor heights of different vehicle makes and models. The upright legs 10 are locked in the extended position at their individual locking hinges 12 as shown in FIGS. 1, 2, 3, 4 and 5. The upright legs 10 fold at the hinges 12 when the latter are unlocked as shown in FIG. 5. The vertical extended height of the legs 10 in relation to the rear basket wheel 9 and cargo floor height is designed so that the rear casters 22 will slightly lift off the ground when the basket is extended into the vehicle as shown in FIG. 5. This will release the load on the hinge 12 which makes it easier to unlock.

The upright legs 10 are connected to the base frame horizontal members 16 by individual lower hinges 19. The upper hinges 14 and lower hinges 19 are non-lockable to allow the basket and base frame assemblies to pivot at this hinges as the cart enters the vehicle as shown in FIG. 4. This prevents unnecessary stress to the frame and hinge structures and will allow the cart to compensate for cargo floor height variations of a vehicle due to changing tire pressure, varying load in the vehicle which changes the cargo floor height, different conditions of the suspension that causes sag, and other related reasons.

The base frame horizontal members 16 are locked in the unfolded position at their individual locking hinges as shown in FIGS. 1, 2, 3, 4, 5, and 6. These base frame horizontal members 16 however can be folded at the hinge 17 when the latter is unlocked as shown in FIGS. 7 and 8. The length of the base frame horizontal member 16 is designed appropriately to take into consideration any obstructions at the bottom of the vehicle that limits the travel of the cart as it enters the cargo area as shown in FIG. 4. The rear basket wheels 9 needs to reach inside the cargo area at a safe lockable position when the basket 1 is pushed to its full extended position inside the vehicle as shown in FIG. 5.

A plurality of casters or wheels 21 and 22 are connected to the base frame of the cart. They can be designed in larger sizes to assist in maneuvering the cart in locations where there are variations in ground surface levels created by sidewalks, steps, gravel, and other similar conditions.

A removable shelf 24 can be added to the cart's base frame for additional cargo space. The shelf, and any items placed on it, must be removed before loading the cart inside the vehicle.

A child seat can be added to the rear of the basket similar to conventional shopping carts. However, a better alternative design for use in this invention is a transferable child seat with appropriate safety harness mechanisms. The safety seat can be conveniently unlatched from the vehicle's seat and latched to the transportable shopping cart's rear cross members 18 and 20. The cart handle 25 is hinged to open for easy mounting of the seat and child. This child safety seat offers a safer option to current known conventional design since the child will be properly harnessed in place.

The cart may be designed to fold flat for storage. It may be stored in the vehicles rear compartment underneath the cargo floor or elsewhere wherever the user chooses.

The basket may be compartmentalized with small protable and collapsible bins or bags that will help the user to transfer the goods from the cart in cases where the cart has no access to the goods final destination.

The material of construction of the transportable cart's components have to be rated to provide the required structural rigidity while minimizing weight. The mechanisms have to be reliable and compact in design to optimize the use of cargo space in the vehicle. Materials such as aluminum, engineering plastics, and other specialized materials are commercially available for this purpose.

FIGS. 2 to 8 illustrate the operation of the transportable shopping cart in sequence. The vehicle in this case has a relatively high cargo floor height. If a vehicle has a cargo floor height that is relatively low enough to eliminate the need to lift the basket and achieve an acceptable working height for the cart during use, the basket lift mechanism can be eliminated in the design and step 2 in the procedure below is by-passed. Examples of these vehicles with low cargo floor heights are certain station wagons and minivans.

Description of the sequence of loading operation of the transportable cart is as follows:

Step 1: See FIG. 2; the transportable cart with goods is brought to the cargo area of the vehicle. The cargo door is open for loading.

Step 2: See FIG. 3; the basket 1 is then lifted to the "up" position by shifting the basket lift handle over the cart from position A to position B. This action simultaneously pivots the lift arm that forces the basket to rotate at the pivot connecting arms 11 to its "up" position.

Step 3: See FIG. 4; the basket is pushed inside the vehicles cargo area. In the process of doing so, the lead-in basket wheel 7 rolls onto the surface of the cargo floor until the upright legs 10 reach the rear bumper of the vehicle.

Step 4: See FIG. 5; the lock mechanism 5 in FIG. 1 is released, and the basket assembly is pushed into the cargo area of the vehicle. The rear basket wheels 9 can now be locked to prevent shifting of the assembly inside the vehicle. At this time the legs locking hinges 12 can be unlocked.

Step 5: See FIG. 6; fold the upright legs 10 at their unlocked hinges 12 while simultaneously pivoting them upwards at the upper hinges 14 until they rest on top of the upper frame horizontal members 15. At this time the base frame locking hinges 17 can be unlocked.

Step 6: See FIG. 7; fold the base frame horizontal members 16 at their unlocked hinges 17 while simultaneously pivoting them upwards at the lower hinges 19 until they rest on top of the folded upright legs 10.

Step 7: See FIG. 8; push in the legs 10, base frame 16 and upper frame 15 assemblies into the cargo area of the vehicle until the lock mechanism 5 in FIG. 1 is engaged. AT this time, the transportable cart and goods are completely loaded inside the vehicle. The cargo door can now be closed.

Reverse the sequence of the procedure as described above to unload the cart from the vehicle. When properly designed, this sequence can be completed in a very short period of time.

The following is a description of a second embodiment of the transportable cart of the present invention for use in commercial applications such as food catering, delivery service, transport of construction materials, toods or equipment, portable display cart, temporary tables for a variety of applications, and others.

Figure 9:
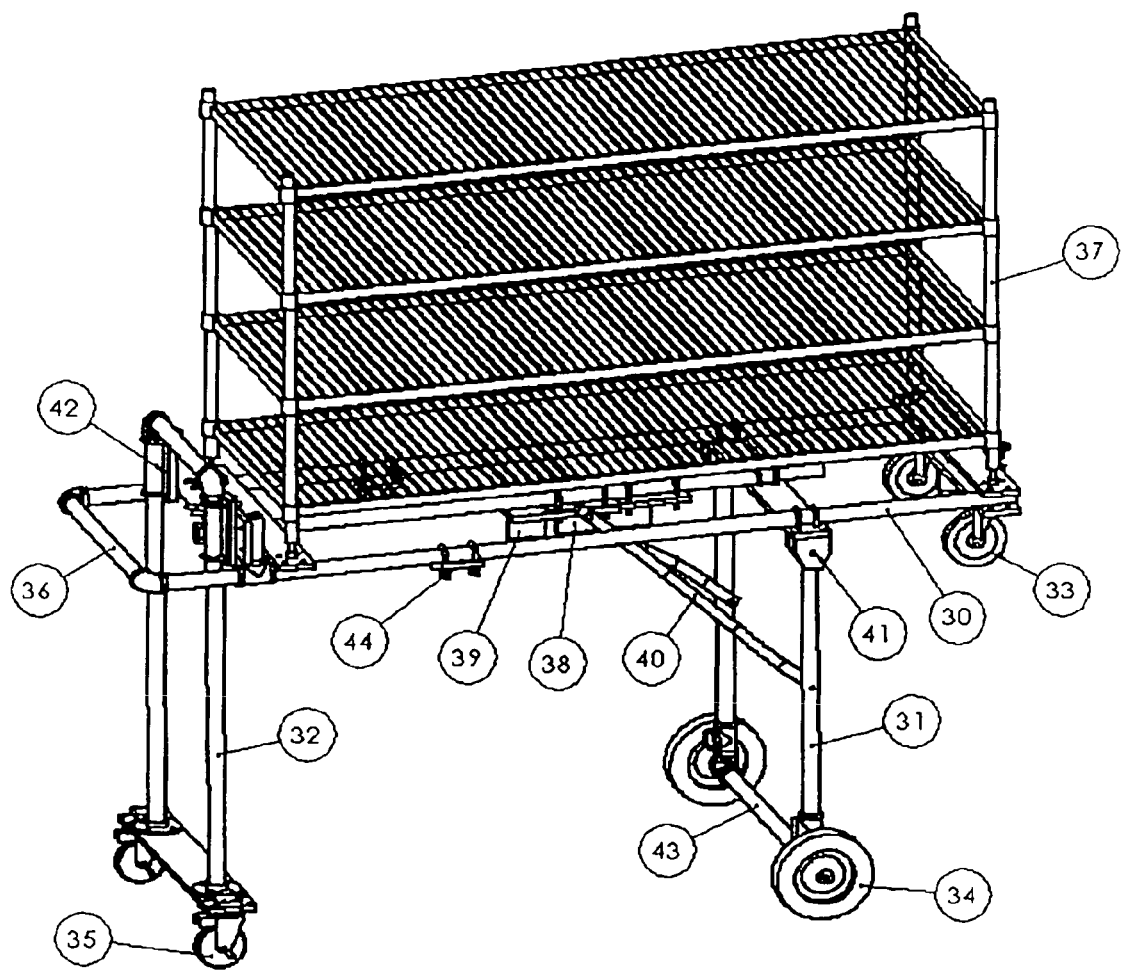
FIG. 9 is an isometric view of a second embodiment of a transportable cart shown with removable shelves.

Referring to FIG. 9, the cart consists of a main frame 30 constructed with a plurality of structural tubes. The main frame 30 is supported with a folding front leg frame 31 and a sliding rear leg frame 32. The front leg frame 31 is held in the upright position by brackets 40 that are locked in place by a locking mechanism 39. The lead in casters 33 at the front of the cart are mounted underneath the main frame. The rear legs 32 are glides up or down and locked in place at the slide mechanism 42. The leg frames are mounted on a plurality of wheels 34 and locking swivel casters 35. The leg frame height can be made adjustable to conform to the different cargo load heights of different vehicles. A handle 36 is connected to the main frame. The cart is configured as shown with shelves 37 that can be replaced with any other material carrying apparatus suitable for the intended use of the cart.

Figure 10:
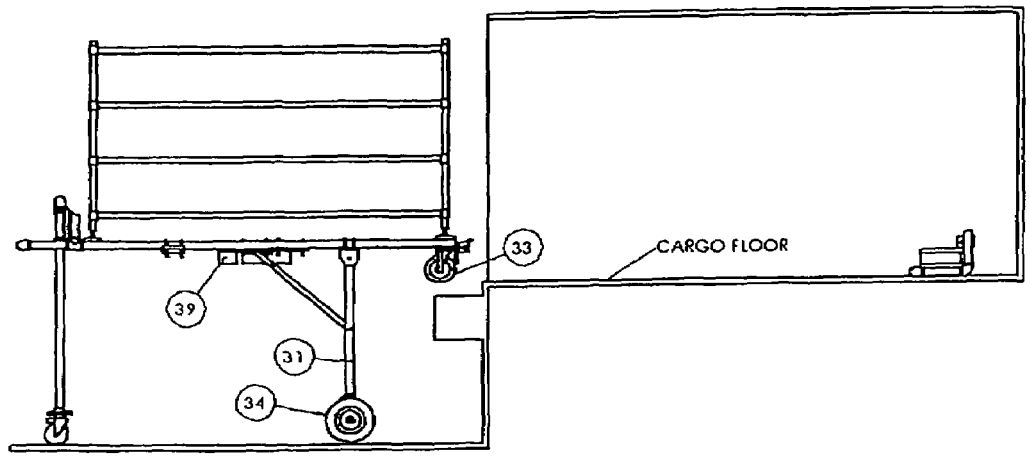
FIG. 10 is a side view of the cart in FIG. 9 ready for loading into a cargo van.
Figure 11:
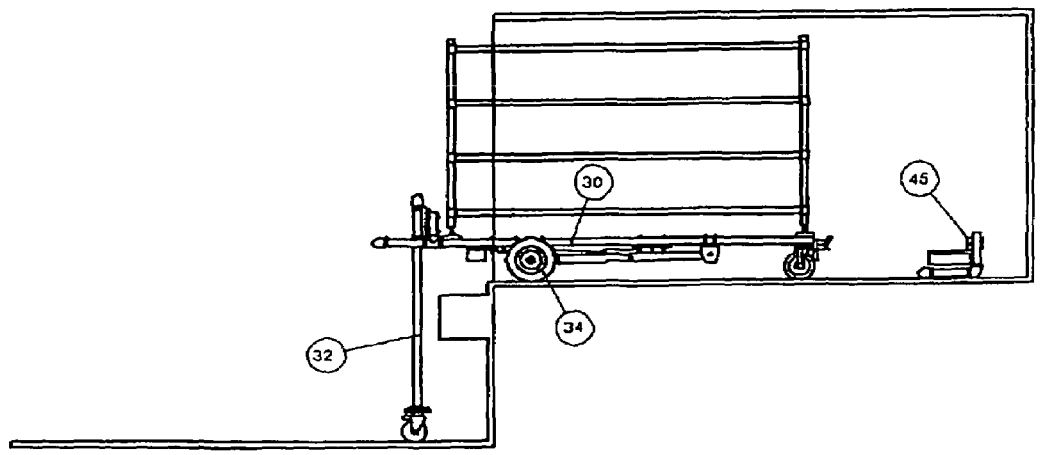
FIG. 11 is a side view of the cart in FIG. 9 as it enters the cargo van with its front legs folded.
Figure 12:
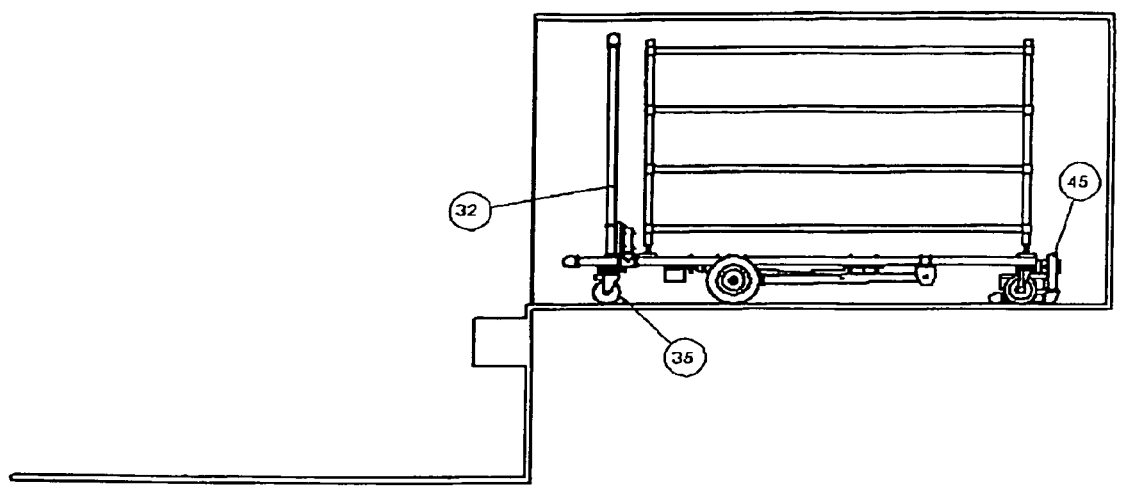
FIG. 12 is a side view of the cart in FIG. 9 with its rear legs raised and is now fully loaded into the cargo van.

FIGS. 10 to 12 demonstrate the sequence of loading the cart into a cargo van. The cart is presented at the loading side of the vehicle as shown in FIG. 10. The cart is pushed into the vehicle until the lead-in casters 33 rolls onto the cargo floor. At this instant, the front weight of the cart and its contents are transferred to the lead-in casters 33 thereby relieving the load from the front leg frame. At this time the lock mechanism 39 is disengaged and the front leg frame 31 folded back underneath the cart. The cart is pushed further into the cargo until the front wheels 34 rolls onto the cargo floor as shown in FIG. 11. At this position, the front axle 43 will rest on the main frame 30 on pads 44 and support the rear weight of the cart thereby relieving the load on the rear leg frame 32 which can now be unlocked and raised. The entire cart can now be pushed into the vehicle as shown in FIG. 12 and the rear weight of the cart is transferred back to the rear casters 35. A floor mounted catch 45 is used in this example to keep the cart in place. Other methods to anchor the cart to the walls or floor of the vehicle can be employed.

Reverse the sequence as described to unload the cart from the vehicle.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A transportable cart for receipt and transport of contents, said transportable cart being foldable into a vehicle cargo area without the necessity of unloading said contents, said transportable cart comprising:

a base support member formed by two opposing longitudinal arms and two opposing cross arms, said base support member having depending wheels for movement of said transportable shopping cart, said opposing longitudinal arms each having a centrally disposed hinge member allowing said opposing longitudinal arms to articulate with respect to themselves;

a pair of opposing upstanding support arms articulatingly secured to said opposing longitudinal members of said base support member at a first lower end, and articulatingly secured to a basket support member at said upper end, each of said upstanding support arms also having a centrally disposed hinge for articulating relationship between said first lower end and said second upper end;

a basket member mounted to slide rails mounted interiorly to said basket support member, said basket member for the receipt of contents, said basket member selectively positionable in vertical relationship with said basket support member;

a handle means articulatingly secured to said basket support member.

2. The transportable cart in accordance with claim 1 wherein said slide rails have depending there from a plurality of wheels engageable with said vehicle cargo area for positioning said slide rails and said basket member in said vehicle cargo area.

3. The transportable cart in accordance with claim 1 wherein said basket member adjusts in height in relationship to said basket support member by means of a pair of piston shock absorbers secured to said basket support member and said basket member on opposing sides thereof.

4. The transportable cart in accordance with claim 2 wherein said basket support member and said basket member are adjusted in height such that said depending wheels from said slide rails are in contact with said vehicle cargo area and positioned therein, said basket and said slide rails being extended forwardly of said basket support member into said vehicle cargo area, said articulating upstanding support arms being folded at said second upper end into said vehicle cargo hold, said upstanding support members being folded at said midpoint and said upstanding support members being folded at said first lower end into said cargo hold, said base support member being folded at a contact point with said upstanding support members and being further folded at said articulating hinge, midpoint, said opposing longitudinal members, said transportable cart and contents being fully positioned within said vehicle cargo hold.

5. A transportable cart in accordance with claim 1 wherein a lock mechanism selectively engages said basket member and said slide rails in a secure position.

* * * * *